United States Patent [19]

Sims, Jr.

[11] 4,029,426

[45] June 14, 1977

[54] TUBULAR FASTENING SYSTEM

[75] Inventor: Dewey M. Sims, Jr., Westland, Mich.

[73] Assignee: Burroughs Corporation, Detroit, Mich.

[22] Filed: May 7, 1975

[21] Appl. No.: 575,240

[52] U.S. Cl. .................................. 403/408; 29/509; 29/525; 29/526; 85/5 R; 85/37; 151/41.72

[51] Int. Cl.² ........................ B25G 3/00; F16D 1/00; F16G 11/00

[58] Field of Search ...................... 85/5 R, 37, 5 M; 29/525, 526, 509; 151/41.72; 52/758 R, 758 J, 758 D; 403/408

[56] References Cited

UNITED STATES PATENTS

| | | | |
|---|---|---|---|
| 850,299 | 4/1907 | Dickerson | 29/525 UX |
| 1,976,776 | 10/1934 | Gookin | 85/37 X |
| 2,276,050 | 3/1942 | Leighton | 151/41.72 UX |
| 2,990,465 | 6/1961 | Dumke et al. | 29/525 X |
| 3,171,196 | 3/1965 | Helitas | 29/525 X |
| 3,828,422 | 8/1974 | Schmitt | 29/525 |

*Primary Examiner*—Charlie T. Moon
*Attorney, Agent, or Firm*—Robert C. J. Tuttle; Leon E. Redman; Carl Fissell, Jr.

[57] ABSTRACT

A tubular fastening system for holding a plurality of members together with a predictable holding force, including a tubular eyelet of ductile but non-work hardening material pressed into a non-circular aperture formed in a rigid support plate. The predictable holding force of the tubular fastening system remains substantially constant upon attaining a predetermined radial pressure on the tubular eyelet at a significantly finite plurality of contact areas defined by the non-circular aperture in the support plate over a wide range of interference between the non-circular aperture and the tubular eyelet.

1 Claim, 19 Drawing Figures

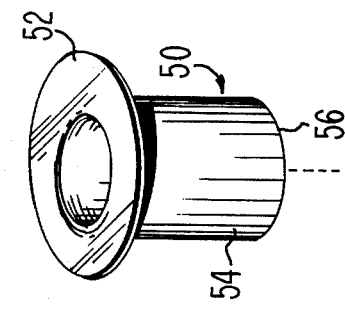
FIG. 1.
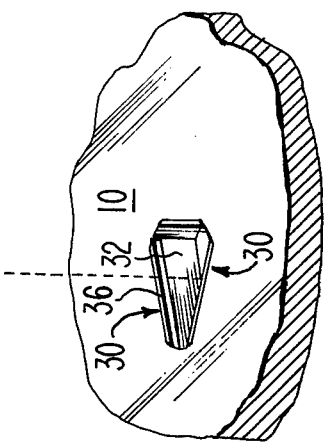
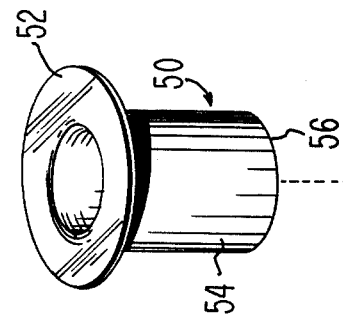
FIG. 2.
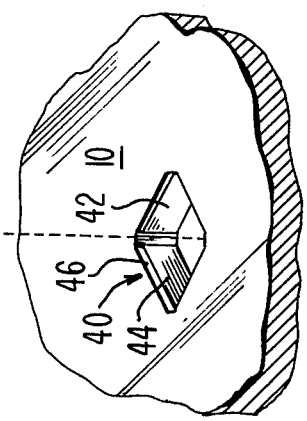
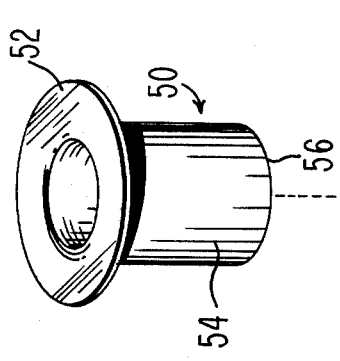
FIG. 3.
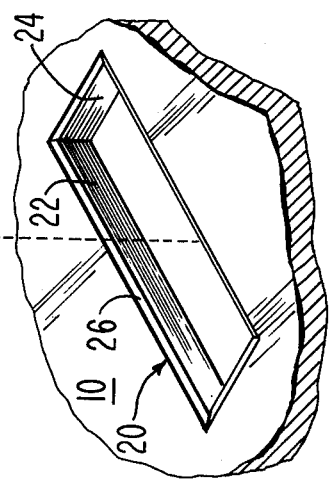

FIG.17.
FIG.18.
FIG.19.
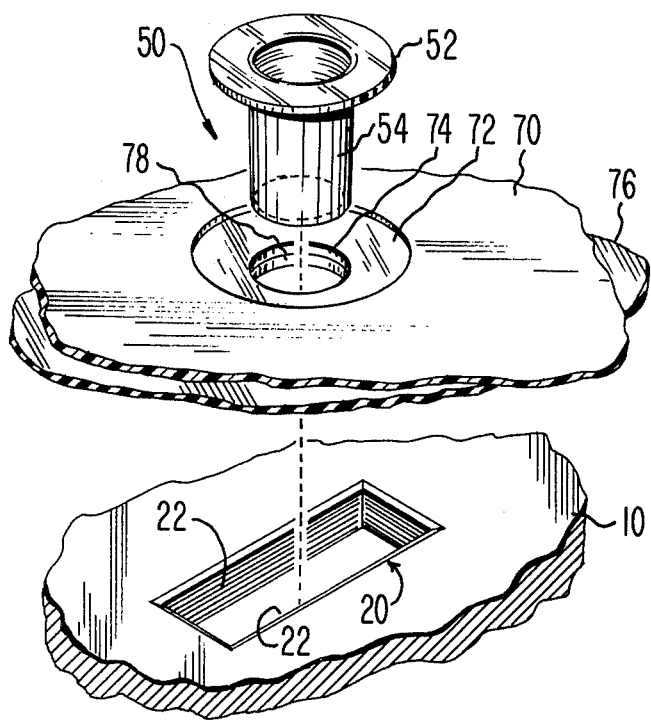
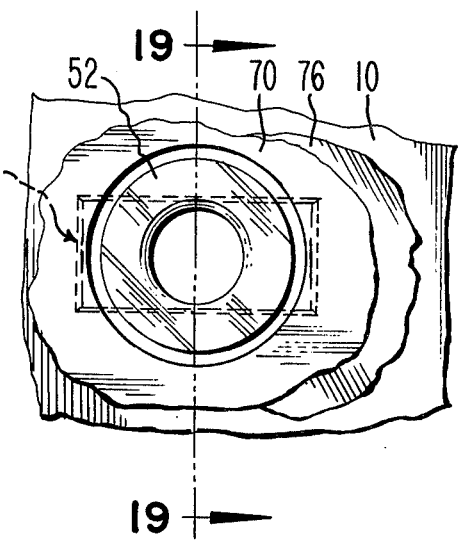
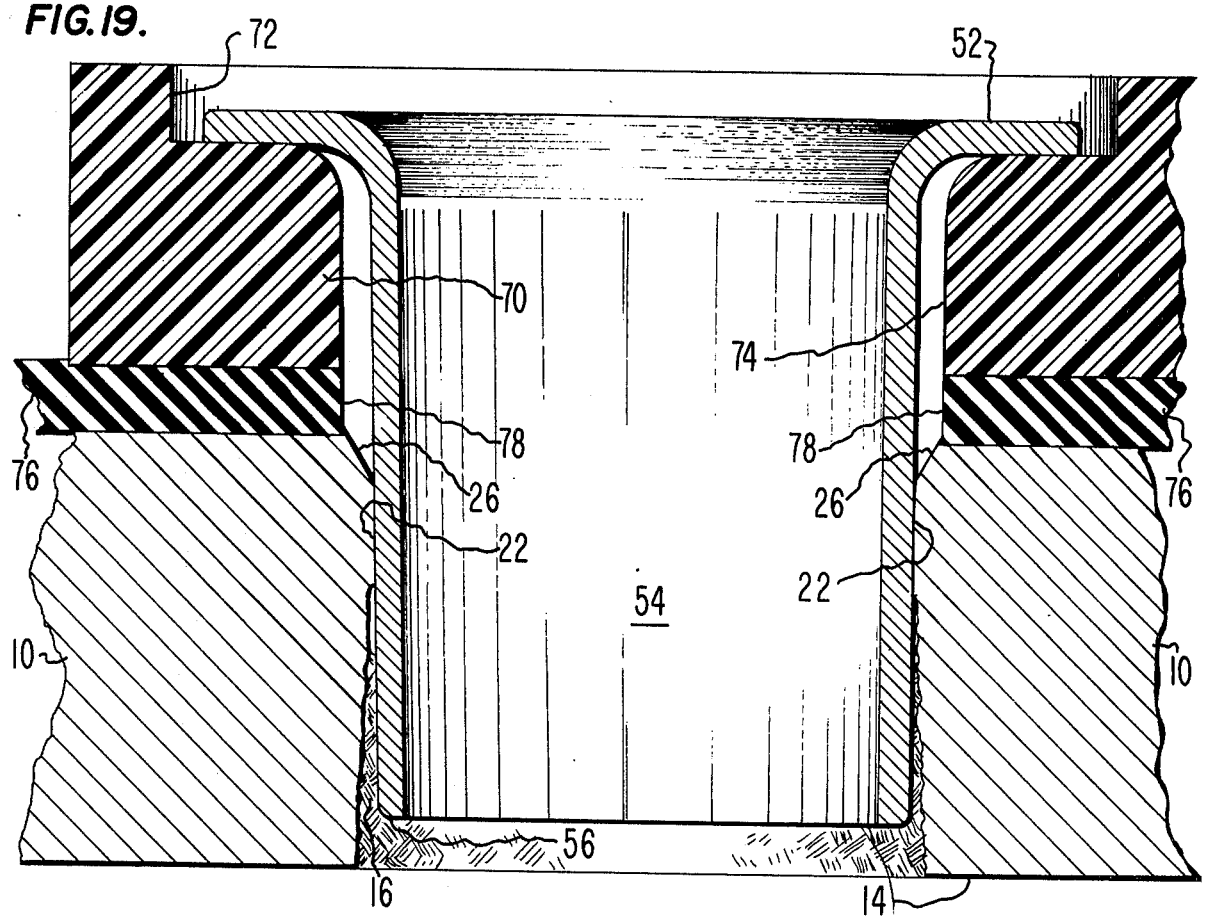

TUBULAR FASTENING SYSTEM

BACKGROUND OF THE INVENTION

This invention relates generally to light load fastening devices, and more specifically to a fastening system employing a tubular eyelet pressed into a non-circular aperture in a rigid support plate for providing a predictable holding force in accordance with the number of contact points between the tubular eyelet and the non-circular aperture in the support plate.

It is well known in the fastening art to employ an eyelet which comprises a tubular metal shank with a head flange at one end as a fastening device. With such conventional eyelets the tubular shank is inserted through a hole in a workpiece and then set by outwardly flanging the end of the shank opposite the head flange. The length of the shank of such eyelets must be sufficient to pass completely through all of the parts of the workpiece being fastened together and project far enough from the workpiece to enable the eyelet shank to be set by outwardly flanging its tail end. Setting of such eyelets in conventional eyeletting machinery has become unreliable due to the eyelet shank collapsing within the thickness of the workpiece under the load imposed axially on the eyelet by the eyelet setting machinery. Also, this flanging operation causes spring back of the eyelet that is not predictable and consequently allows an intermediate and undesirable loosening between the workpiece being fastened together. Besides, a flange may be undesirable for low profile designs or in applications which require a flat surface without protrusions.

Furthermore, any secondary operation such as outward flanging the tail end of the eyelet, adds to the complexity, time, and cost of fastening workpieces together. Also, the workpiece parts to be fastened together must be accessible from both sides in order to outwardly flange the tail end of the eyelet.

Other prior art fasteners include resiliently compressible shank portions which are typically barrel-shaped. Such fasteners are intended for use in circular apertures of slightly smaller cross sectional dimensions than an enlarged area of the resiliently compressible shank. Then, as the shank is forced into the circular aperture, it is compressed and its resilience provides a grip on the rim of the aperture that it extends through. While resilient shank fasteners need only be accessible from one side, their specialized and a typical design has made them prohibitively expensive for widespread commercial application. Furthermore, unless such resiliently compressible shanks are barrel-shaped and extend a significant distance through the workpiece, they do not provide reliable fastening. Still other fasteners having cylindrical shanks of resilient material provide a gripping bulge on the blind side of the workpiece when pressed into a circular aperture. These fastening systems depend on extremely tight tolerances of both the fastener and the aperture formed to receive the fastener. Consequently, widespread use of such fasteners is prohibitively expensive.

In the assembly of various devices, it is often desirable to provide a predictable predetermined holding force when fastening various members of the assembly together. For example, in the assembly of electronic devices, it is often desirable to provide a dust seal between switch housing components for preventing contamination of the switch contacts contained therein. To this end a compressible sealing member may be sandwiched between the housing components when fastening them together. If a fastener is employed that provides too light of a holding force, then a good seal is not created. On the other hand, if the fastener provides a holding force in excess of the compression of the compressible sealing member, the resulting distortion of the sealing member causes a poor seal to be created and may even damage or distort the parts being assembled causing expensive assemblies to be ruined. Before the present invention, there has been no simple fastener that would provide a predictable predetermined holding force. Therefore, it has not been previously possible to fasten components together with the holding force of the fastener reliably matched to the compression of the sealing member with an inexpensive fastening system.

SUMMARY OF THE INVENTION

It is the principal object of this invention to create a predictable and substantially constant holding force in a simple fastening system.

It is another object of this invention to shorten the shank of a fastener without sacrificing its holding ability.

It is a further object of the invention to improve the reliability of the installation of fasteners in a fastening system.

It is a yet further object of this invention to simplify installation of fasteners in a fastening system with reduced time and cost.

It is a yet further object still of the present invention to fully set a fastening device in a fastening system with a single operation wherein the workpiece need only be accessible from one side.

It is a still further object of this invention to obviate additional holes through eyeletted subassemblies employed in an assembly requiring the subassembly to be fastened to the assembly by a screw or bolt, thus maximizing the area of the subassembly that may be employed for other purposes.

It is a still further object yet to provide a fastening system employing an eyelet that does not protrude the outward surface of the workpiece upon full insertion therein.

It is a yet further object still to provide an improved seal assembly and predetermine the holding force required of the fastening system to maintain a good seal.

It is an even further object yet of the present invention to approximately match the fastener holding force with the compression of a sealing member.

Another object is to predetermine the force required to set the fastening device into the fastening system.

An even further object yet is to provide a fastening system in which the fastener may be re-used several times while still achieving the above objects.

It is a still further object yet of the present invention to provide a fastening system in which a conventional eyelet that is inexpensive and readily available commercially may be employed while still achieving all of the above objects.

A still further object yet is to liberalize the tolerances of radial interference between the fastening device and its associated support member.

BRIEF DESCRIPTION OF THE INVENTION

In achieving the above-mentioned objects, the fastening system of the invention utilizes a tubular fastening device inserted into a non-circular aperture formed in a support member in a multi-contact relationship for retaining the tubular fastener in the support member at a predictable and substantially constant holding force.

BRIEF DESCRIPTION OF THE DRAWING

The foregoing objects and advantages of the invention, together with other objects and meritorious features which may be obtained by its use, will be apparent from the following detailed description, especially when read in conjunction with the drawing, in which:

FIGS. 1 through 3 show in exploded perspective views three alternative embodiments of the present invention;

FIG. 17 is an exploded perspective view illustrating the orientation and order of assembly of the elements of the present fastening device employed to form a sealed assembly;

FIG. 18 is a top plan view of the completed assembly of FIG. 17; and

FIG. 19 is an enlarged cross section of the sealed assembly of the present invention taken along the lines 19—19 of FIG. 18.

DETAILED DESCRIPTION OF THE DRAWING

Figure 5:
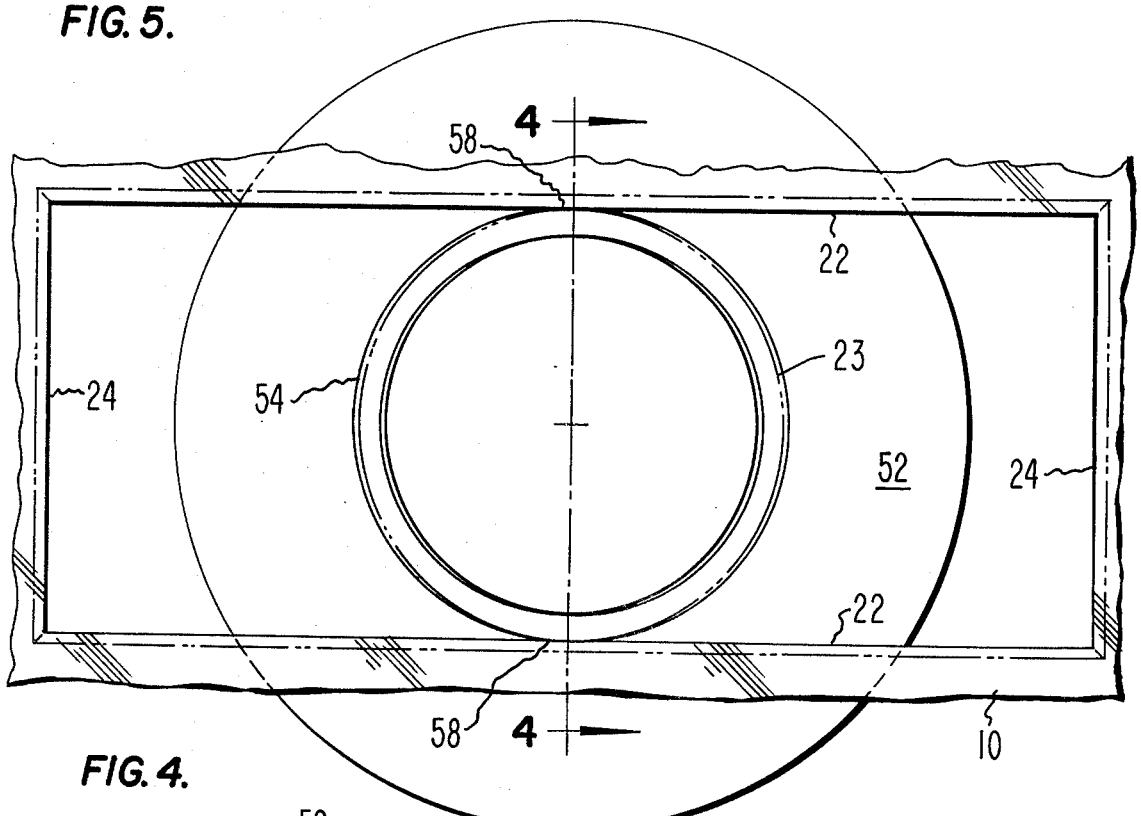
FIG. 5 is an enlarged bottom plan view of an eyelet inserted into a substantially rectangular aperture of a support plate in the present invention.

The tubular fastening system of the present invention employs a rigid support plate 10 (FIGS. 1 through 9 and 15 through 19) having a non-circular aperture formed therein for receiving a tubular eyelet 50. The eyelet 50 retains itself in the non-circular aperture defined in the support plate 10 at a substantially constant and readily predictable holding force, as will be explained hereinafter.

In the preferred embodiment of the invention, the rigid support member 10 comprises a stainless steel plate. The eyelet 50 employed in the present fastening system may comprise a conventional brass tubular eyelet. Such eyelets are conveniently provided with a head flange 52 at one end of a hollow shank 54 having a circular cross section whose length is defined by a lead-in edge 56 at the end opposite the head flange 52. The cross section of the hollow shank 54 is typically manufactured to have a substantially constant diameter along its entire length. These tubular eyelets are very inexpensive and commerically available in a variety of sizes. These inexpensive tubular eyelets 50 are typically manufactured with very loose tolerances since conventional commercial applications do not require otherwise.

In FIG. 1, the tubular fastening system of the present invention is shown in one of many possible alternate embodiments. A substantially rectangular aperture 20 is defined in the rigid support member 10 by substantially parallel and opposed bracing sidewalls 22 spaced apart a predetermined distance by spacer sidewalls 24. A bevel or chamfer 26 is provided at the outer surface of the support member 10 leading into each of the opposed bracing sidewalls 22. The length of the flat and substantially parallel bracing sidewalls 22 may be defined in the rigid support member 10 to be as long as desired. This provides an added degree of freedom in aligning the tubular eyelet 50 with the non-circular aperture 20 for insertion therein.

The bracing sidewalls 22 are spaced a predetermined distance apart depending on the outer diameter of the thin walled hollow shank 54 of the tubular eyelet 50. The maximum spacing between the bracing sidewalls 22 will be defined as slightly less than the minimum outer diameter of the shank 54. The chamfer 26 provides assistance in directing the lead-in edge 56 of the shank into the non-circular aperture 20 between the bracing sidewalls 22.

Figure 4:
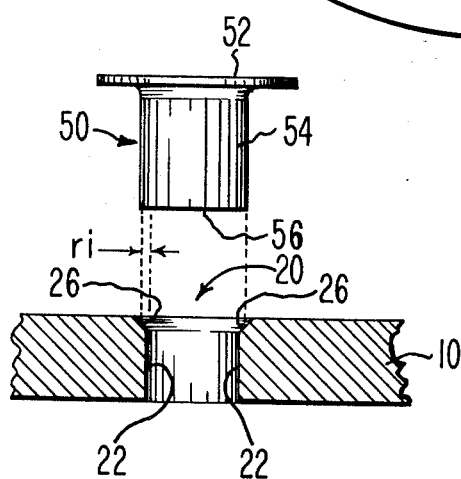
FIG. 4 is a cross section of the support plate of the invention taken along the lines 4—4 of FIG. 5 with an eyelet aligned with the aperture prior to insertion therein.

Referring to FIG. 4, the radial interference, designated ri, between the outer periphery of the shank 54 and the radius of a theoretically inscribed circle 23 of the non-circular aperture 20, defined by the parallel bracing sidewalls 22, is sufficient to cause ductile yielding of the shank 54 at the two discrete contact areas 58 (FIG. 5). The amount of radial pressure, which is caused by the elastic characteristic of the eyelet material on the discrete contact areas 58 after the point of ductile or plastic yielding of the eyelet material, remains substantially constant for a tubular shank 54 formed from material that is ductile yet non-work hardening, for example, soft brass. This radial pressure is also readily predictable as will be described hereinafter.

In this first alternate embodiment of the tubular fastening system of the present invention, the shank 54 of the tubular eyelet 50 is held in the substantially rectangular contoured aperture 20 in the support plate 10 by a pair of directly opposed forces comprising the radial pressure from the contact areas 58 of the shank against the bracing sidewalls 22 of the aperture 20 (FIGS. 1, 4 and 5). This causes the eyelet shank 54 to become slightly elliptical.

Figure 8:
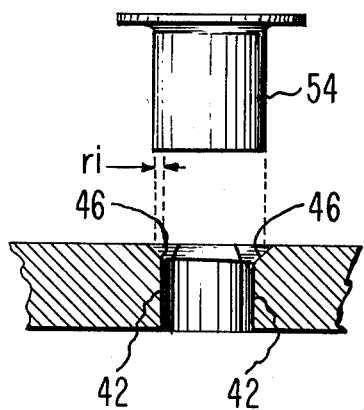
FIG. 8 is a cross section of a substantially square shaped aperture formed in a support plate taken along the lines 8—8 of FIG. 9 prior to insertion of an aligned eyelet.
Figure 9:
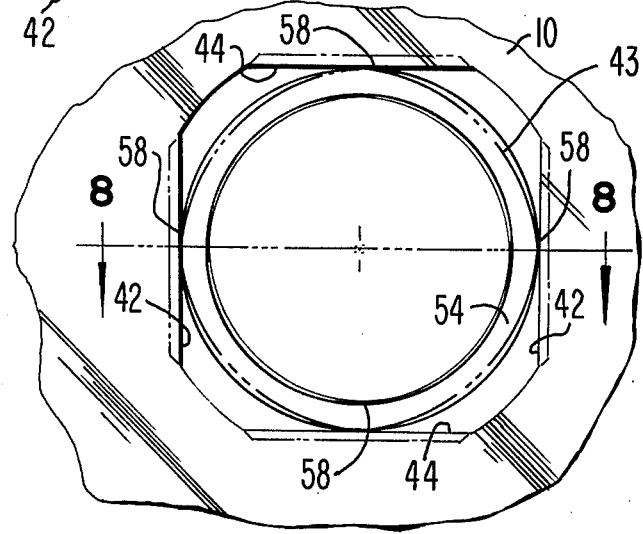
FIG. 9 is a bottom plan view of a substantially square shaped aperture in a support plate of the present invention with an eyelet inserted therein.

A second alternate embodiment is shown in FIGS. 2, 8 and 9 wherein a substantially square shaped aperture 40 is defined in the support member 10. The substantially square contoured aperture is defined by two pairs 42, 44 of diametrically opposed bracing sidewalls. A chamfer 46 is provided in the outer surface of the support member 10 adjacent and leading into each of the bracing sidewalls 42 and 44. The radial interference (ri) between the outer radius of the shank 54 and the radius of a theoretically inscribed circle 43 of the non-circular aperture 40 may be best seen in FIG. 8. The four discrete contact areas 58 between the rigid bracing sidewalls 42 and 44 are the outer periphery of the thin walled eyelet shank 54 and may be best seen in FIG. 9.

Figure 6:
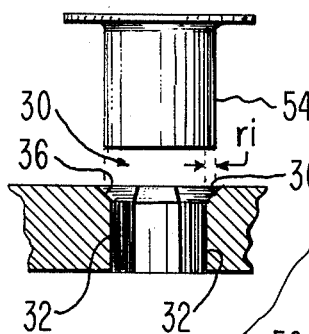
FIG. 6 is a cross section of an apertured support plate of the present invention taken along the lines 6—6 of FIG. 7 prior to insertion of an aligned eyelet.
Figure 7:
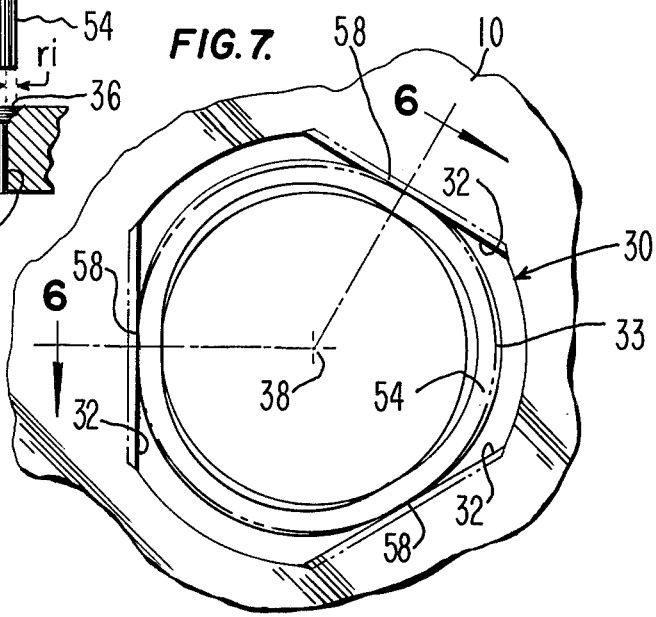
FIG. 7 is a bottom plan view of a substantially triangular contoured aperture of a support plate in the present invention with an eyelet inserted therein.

Similarly, another embodiment yet is shown in FIGS. 3, 6 and 7 in which a substantially triangular or three sided aperture 30 is defined in support member 10. The three sided aperture 30 in support member 10 is defined by three mutually opposing bracing sidewalls 32. The radius of a theoretically inscribed circle 33, centered at 38, of the aperture 30 touching the three bracing sidewalls 32, is defined in accordance with the predetermined radial interference (ri) required for providing three discrete contact areas of ductile yielding of the shank 54 upon insertion therein. A bevel of chamfer 36 is provided in the outer surface of the support member 10 leading inward toward each of the bracing sidewalls 32 in areas corresponding to the initial points of contact with the lead-in edge 56 thereby providing assistance for commencing the insertion of the eyelet 50 into the non-circular aperture 30.

Figure 11:
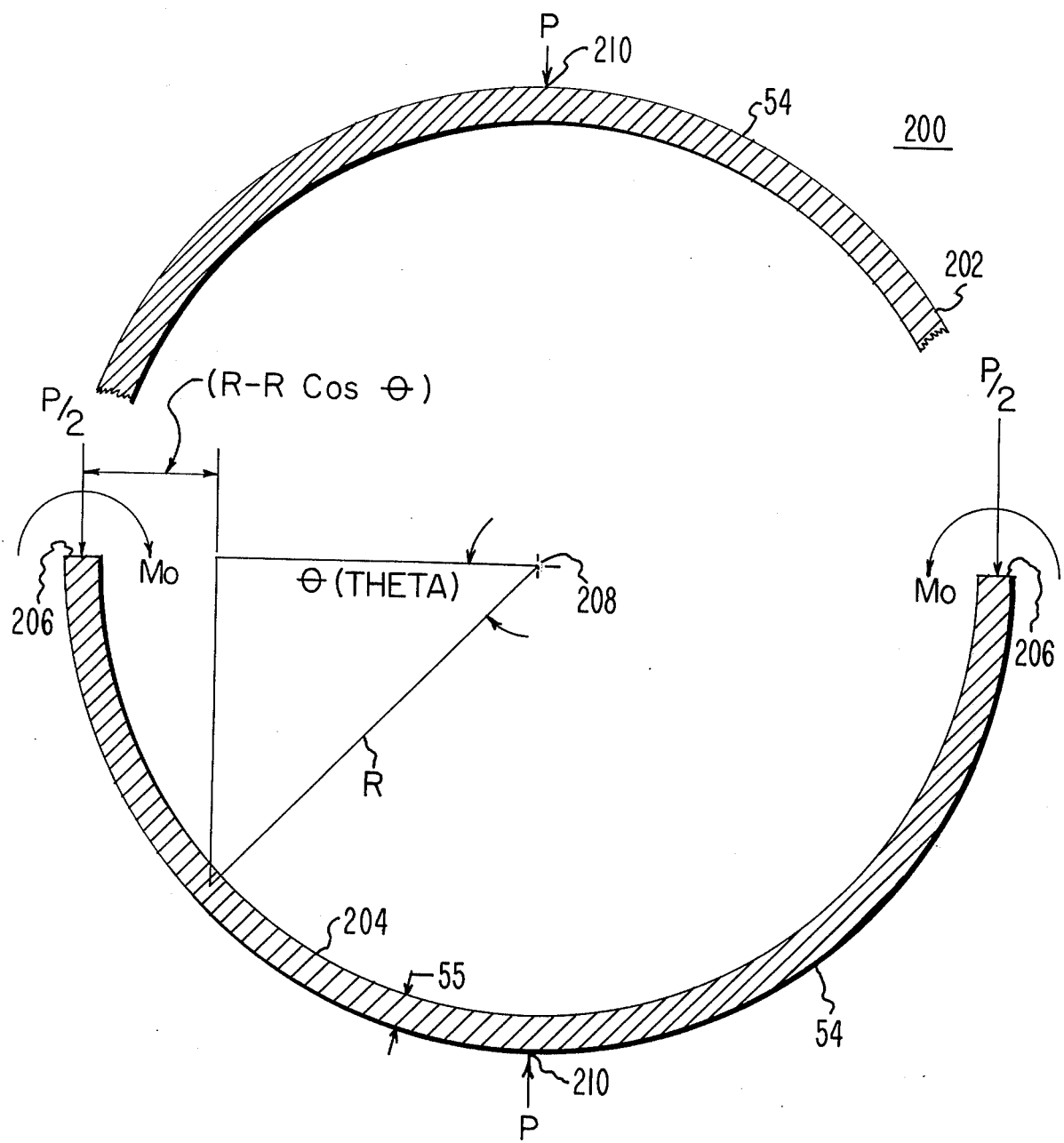
FIG. 11 is a free body diagram of a cross section of the eyelet shank taken along the plane of application of radical pressure from the sides of a substantially rectangular shaped aperture in a support plate of the present invention shown in FIGS. 1, 4 and 5.

As an aid in conceptualizing the present invention, FIG. 11 illustrates a free body diagram of a section 200 of the shank 54 of the eyelet 50 taken along the plane of application of radial pressure (P) at the two opposed sides 22 of a substantially rectangular or two sided aperture 20 (FIGS. 1, 4 and 5). A section half 202 of the section 200 is broken away to permit a simplified analysis of the forces and moments acting only on the remaining portion 204 of the section 200 of the shank 54 along this plane. Thus, two break lines 206 are established at the extremes of the portion 204 under analysis. These break lines 206 are assumed to be in a substantially cantilevered condition. With radial pressure (P) applied to the shank 54 at the two points 210 indicated, the forces at each of the break lines will be equal to P/2 and perpendicular to the break lines 206. Thus a balanced condition is established with the sum of the forces at the break lines 206 equal to the radial pressure (P) applied to one of the two contact areas 58 (FIG. 5) on the periphery of the eyelet shank 54. These are the only significant forces acting along the plane of the section 200 of the shank 54.

A bending moment ($M_o$) may also exist at each of the break lines 206. The value of this bending moment ($M_o$) is unknown. In order to find the value of $M_o$, the following equation must be solved for $M_o$.

$$M = M_o - P/2 \; (R - R_{cos}\theta) \quad (1)$$

where $M$ is the bending moment in 1b. at the point of analysis for a given angle THETA. $M_o$ is the bending moment in lbs. at each break line 206; $P$ is the radial pressure in lbs. on one contact area 58 of the shank; $R$ is the mean radius in inches of the shank of the eyelet; and THETA is the angle of the arc under analysis.

In order to solve for the linear deflection at one contact area 58, the energy equation for this free body diagram of FIG. 11 is established as follows:

$$\Phi = \frac{1}{EI} \int_o^{\pi/2} M \frac{\delta M}{\delta M_o} R d\theta \quad (2)$$

where $\Phi$ is the angular deflection at the point of application of radial pressure (P); $E$ is the modulus of elasticity in pounds per square inch (psi) of the shank; and $I$ is the moment of inertia of the shank cross-section about the eyelet centerline 208. Taking advantage of symmetry, the limits 0 to $\pi/2$ are chosen for analysis corresponding to the 90° THETA limits of the half 204 of the free body diagram of FIG. 11 under analysis. Since there are actually 180° of the free body diagram under analysis equation (2) becomes $$\Phi = \frac{2}{EI} \int_o^{\pi/2} M \frac{\delta M}{\delta M_o} R d\theta \quad (3)$$

The free body energy equation (2) was derived in accordance with Castigliano's theorem which is described in detail in Chapter 8 of the text entitled *Engineering Considerations of Stress, Strain, and Strength* by Robert C. Juvinall published by McGraw-Hill, Inc. in 1967, which is incorporated by reference herein. The general deflection equation for bending is given in Table 8.3 on page 150 of this text.

The symmetry of the eyelet shank prohibits any angular bending at the point 58 of application of radial pressure (P). Therefore, it may be assumed, especially for small deflections, that the angular deflection ($\Phi$) is zero. Setting $\Phi$ equal to zero, equation (3) becomes:

$$0 = \frac{2}{EI} \int_o^{\pi/2} M \frac{\delta M}{\delta M_o} R d\theta \quad (4)$$

Substituting the value of M from equation (1) into equation (4) and solving equation (4) for $M_o$ in terms of P and R results in the following equation:

$$M_o = \frac{PR}{2} - \frac{PR}{\pi} \quad (5)$$

Equation (5) may be restated as:

$$M_o = K_i PR \quad (6)$$

The value for $M_o$ in equation (6) may be substituted into equation (1) which becomes:

$$M = K_i PR - P/2 \; (r - R_{cos}\theta) \quad (7)$$

The energy equation for the free body diagram of FIG. 11 for linear deflection at the point 210 of application of radial pressure (P) is as follows:

$$ri = \frac{2}{EI} \int_0^{\pi/2} M \frac{\delta M}{\delta P} R d\theta \qquad (8)$$

where $ri$ is the linear deflection of the contact area 58 at the point 210 of application of radial pressure (P) on periphery of the shank 54 and therefore determines the minimum desired radial interference between the outer periphery of the eyelet shank 54 and each bracing sidewall 22.

Substituting from equation (7) the expression for M into equation (8) and then solving for the linear deflection ($ri$), which will determine the minimum required radial interference, results in the following linear relationship:

$$ri = K_2 PR^3/E \qquad (9)$$

Since the modulus of elasticity (E), cross section moment of inertia (I), and mean radius (R) are all fixed values for a particular eyelet 50, equation (9) may be simplified to:

$$ri = K_3 P \qquad (10)$$

remembering that (P) represents the radial pressure applied to the eyelet at one contact area 58. Thus the spring rate for a given eyelet 50 in a two sided aperture 20 is established.

The radial pressure (P) required for ductile yielding of the eyelet shank 54 at a contact area 58 may be readily determined by equating the yield strength ($S_y$) in psi of the eyelet material with the maximum stress ($\sigma$) of that material according to the following ultimate elastic equation:

$$S_y = \sigma = M_{max} C/I \qquad (11)$$

where C is one half of the thickness of the shank wall 55 in inches; where $M_{max}$ is obtained by solving equation (7) with the value of THETA resulting from solving the following equation for THETA:

$$\sigma M/\sigma \theta = 0 \qquad (12)$$

This value of $M_{max}$ should be compared with M at the end conditions to insure that the value for M obtained is indeed $M_{max}$; and $$I = bh^3/12 \qquad (13)$$

where $b$ and $h$ represent the rectangular dimensions of the section in inches employed to determine the amount of inertia (I).

Substituting from equation (6) the value of $M_o$, where $M_o$ is equal to $M_{max}$, into equation (11) and solving for P gives the following equation for the radial pressure (P) required for ductile yielding of the contact area 58 of the eyelet:

$$P = S_y I/K_1 RC \qquad (14)$$

remembering that ($S_y$) is the yield strength of the material of the shank 54, I is the moment of inertia of the cross section of the shank at the contact area 58, $K_1$ is a predetermined constant, R is the mean radius of the eyelet shank, and C is one half the wall thickness 55 of the shank 54. Thus, it can be appreciated that the radial pressure (P) may be readily predicted. The radial interference ($ri$) between the sidewall 22 of the non-circular aperture 20 in the support plate 10 at a point of minimum aperture diameter and the periphery of the shank 54 of the eyelet 50 required to achieve sufficient radial pressure (P) to cause ductile yielding of the shank 54 at the contact area 58 is determined by solving equation (10) with this value of P.

The total radial pressure ($P_t$) in lbs., applied to the eyelet shank 54 is simply $$P_t = NP \qquad (15)$$

where N is the number of discrete areas 58 of radial interference and contact with the bracing sidewalls 22 of the non-circular aperture of the fastener support plate 10.

Figure 12:
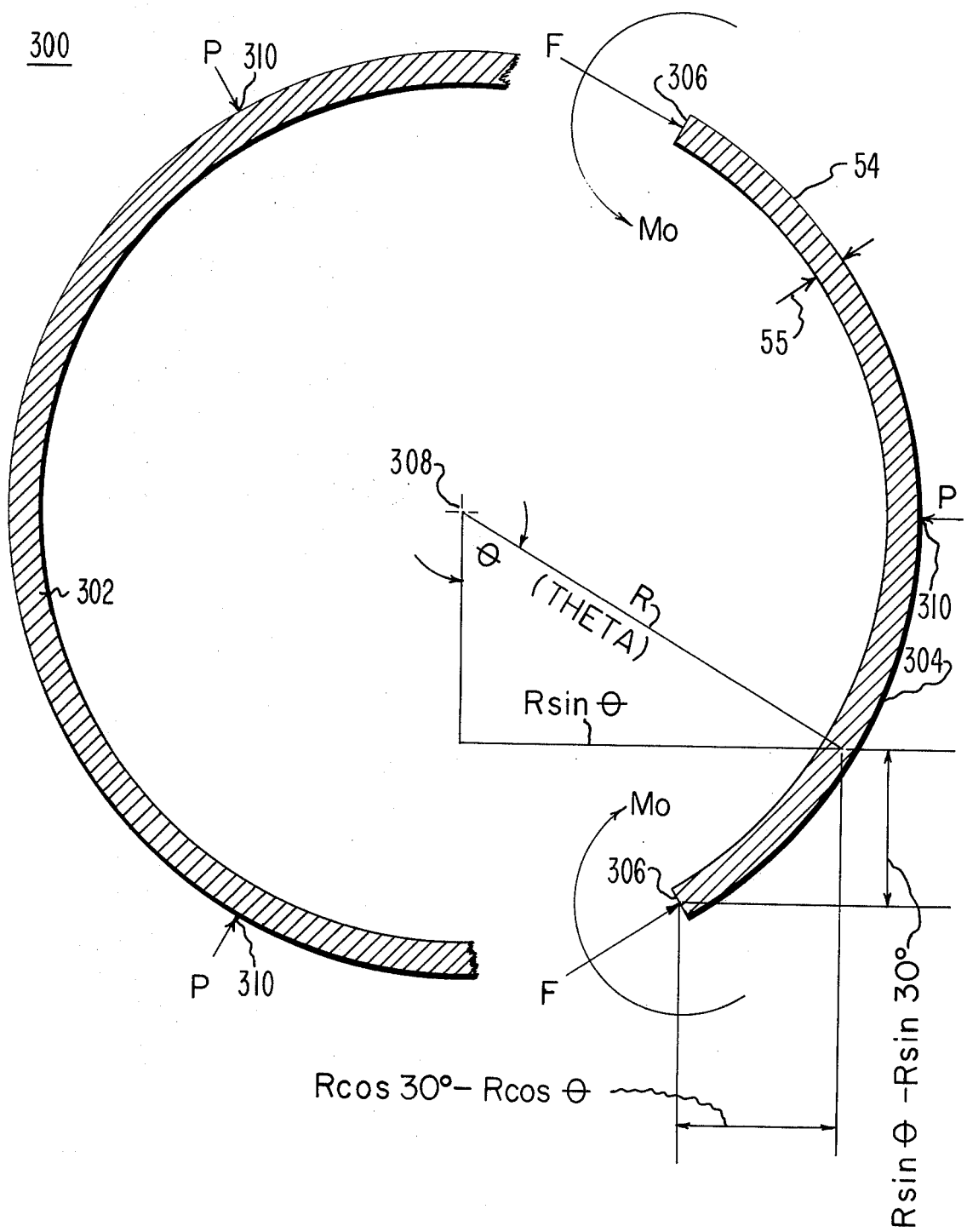
FIG. 12 is a free body diagram of a cross section of an eyelet shank taken along the plane of application of radial pressure from a substantially triangular shaped aperture in support plate of the present invention shown in FIGS. 3, 6 and 7.

FIG. 12 illustrates a free body diagram of the section 300 of the shank 54 of an eyelet 50 taken along the plane of application radial pressure (P) by three mutually opposing sizes of a three sides aperture (FIGS. 3, 6 and 7). A portion 302 equivalent to 2/3 of the section 300 is broken away to permit a simplified analysis of the forces and moments acting on the remaining portion 304 which is equivalent to 1/3 of the section 300 of the shank. Thus, two break lines 306 are established at the extremes of the remaining portion 304 under analysis. These break lines 306 are assumed to be in a substantially cantilevered condition. With radial pressure (P) applied to the shank 54, at the three points 310 indicated, the forces (F) at each of the two break lines 306 will be equal to P/2 (cos 30°) and acting in the same plane in a direction perpendicular to each of the break lines 306. These are the only linear forces acting along the plane of the section 300 of FIG. 12 that need to be analyzed.

A bending moment ($M_o$) may also exist at each of the break lines 306. Since the value of this bending moment ($M_o$) is unknown, it is necessary to solve the following equation for $M_o$.

$$M = M_o - P/2(R\cos 30° - R\cos\theta) + P/2\tan 30°(R\sin\theta - R\sin 30°) \qquad (16)$$

where $M$ is the bending moment in pounds at the point of analysis for a given angle THETA; $M_o$ is the bending moment in pounds at each of the break lines 306; $P$ is the radial pressure in pounds at each of the points 310 of application; $R$ is the mean radius in inches of the eyelet shank of the eyelet; and THETA is the angle of arc under analysis.

In order to solve for the linear deflection at one point of contact 310, the energy equation for the free body diagram of FIG. 12 is established as follows:

$$\Phi = \frac{2}{EI} \int_{\pi/6}^{\pi/2} M \frac{\delta M}{\delta M_o} R d\theta \qquad (17)$$

remembering that $\Phi$ is the angular deflection at the point of application of radial pressure (P), E is the modulus of elasticity in psi of the shank; and I is the moment of inertia of the shank cross section about the eyelet centerline 308. Again, taking advantage of the symmetry of the eyelet shank, the limits $\pi/6$ to $\pi/2$ are employed, corresponding to the 60° THETA limits of the remaining portion 304 of the section 300 (FIG. 11) under analysis.

Equation (17) may be set equal to zero, as was equation (3) because of the symmetry of the eyelet shank 54. The following equation results:

$$O = \frac{2}{EI} \int_{\pi/6}^{\pi/2} M \frac{M}{M_o} R d\theta \qquad (18)$$

Substituting the value of M from equation (16) into equation (18) and solving equation (18) for $M_o$ in terms of P and R results in the same equation as equation (6), however a different value of $K_1$ is obtained.

The value for $M_o$ in equation (6) may be substituted into equation (16) which becomes:

$$M = K_1 PR - P/2R \cos 30° - R\cos\theta) + P/2 \tan 30°(-R\sin\theta - R\sin 30°) \qquad (19)$$

The energy equation for the free body diagram of FIG. 12 for linear deflection at the point 310 of application of radial pressure (P) is as follows:

$$ri = \frac{2}{EI} \int_{\pi/6}^{\pi/2} M \frac{\delta M}{\delta P} R d\theta \qquad (20)$$

where $ri$ is the linear deflection of the contact area 58 at point 310 of application of radial pressure (P) are the periphery of the shank 54.

Substituting from equation (19) into equation (20) and then solving for the linear deflection results in the same equation as equation (9), however a different value for $K_2$ is obtained. Similarly, equation (10) will be also applicable to the linear deflection for the free body diagram of FIG. 12 with a unique value for $K_3$. The equation (10) will thus be the spring rate for a given eyelet 50 in a three sided aperture 30. The radial pressure (P) required for ductile yielding of the eyelet shank 54 in a contact area 58 or point 310 of application of radial pressure may be readily determined according to the ultimate elastic equation (11). Equations (14) and (15) will also be equally applicable to the three sided alternate embodiment analyzed in FIG. 12.

Figure 13:
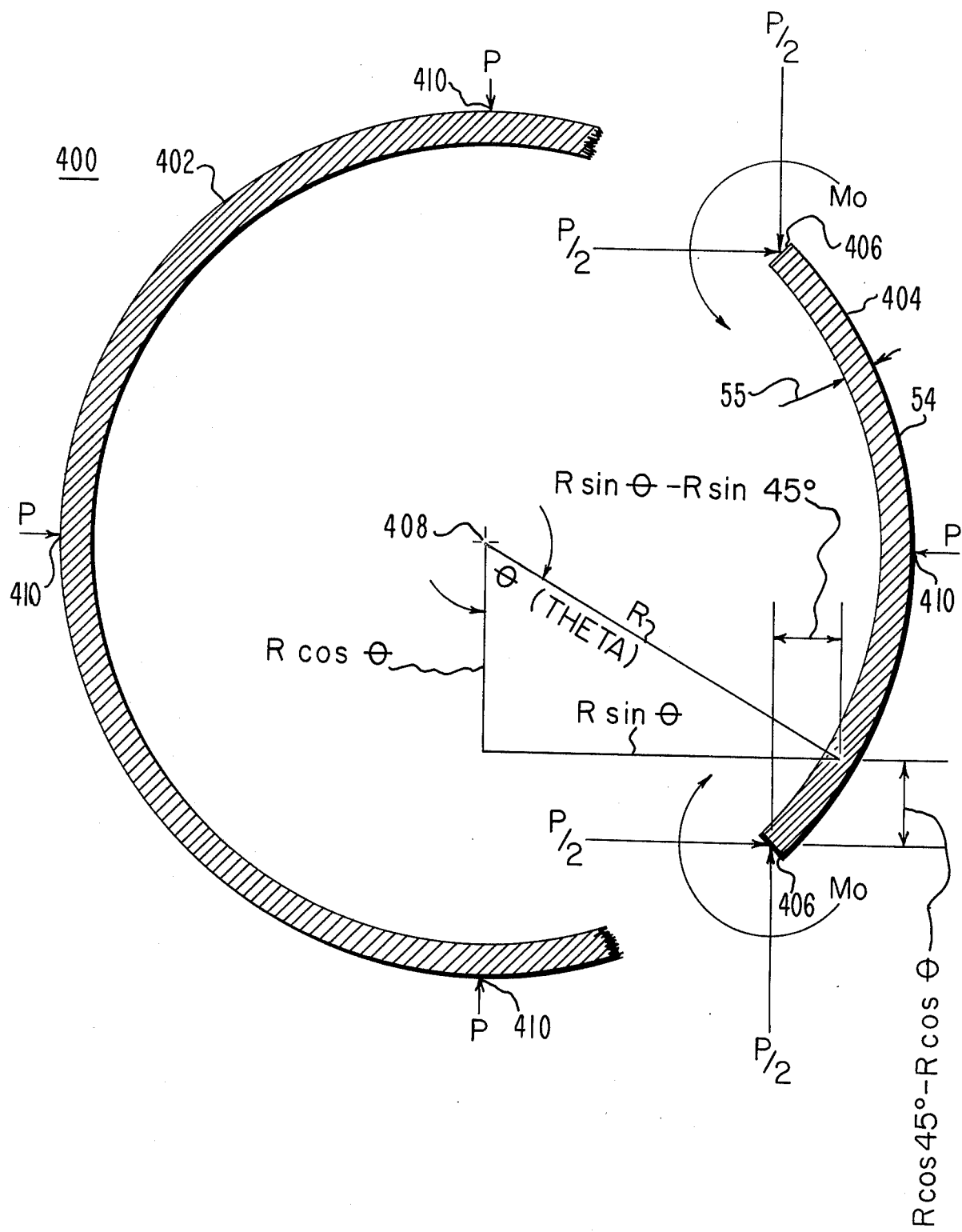
FIG. 13 is a free body diagram of a cross section of an eyelet shank taken along the plane of application of radial pressure from the sides of a substantially square shaped aperture in a support plate of the present invention shown in FIGS. 2, 8 and 9.

The analysis of the free body diagram of FIG. 13 for the four-sided aperture 40 alternate embodiment (FIGS. 2, 8 and 9) is similar to the preceding analysis. For this analysis, however, a portion 402 equal to three quarters of the cross section 400 is broken away. The remaining portion 404, equal to one quarter of the cross section 400, is analyzed in accordance with the following equation for the bending moment (M):

$$M = M_o + P/2(R\sin\theta - R\sin 45°) - P/2(R\cos 45° - R\cos\theta) \qquad (21)$$

The limits for THETA are from $\pi/4$ to $\pi/2$ and equation (17) becomes $$\phi = \frac{2}{EI} \int_{\pi/4}^{\pi/2} M \frac{\delta M}{\delta M_o} R d\theta \qquad (22)$$

Likewise, equation (20) becomes $$ri = \frac{2}{EI} \int_{\pi/4}^{\pi/2} M \frac{\delta M}{\delta P} R d\theta \qquad (23)$$

The analysis is completed in the same fashion as the preceding analysis with further unique values for constants $K_1$, $K_2$, $K_3$.

Thus it may be appreciated that, while an appropriate free body diagram must be established for each of the three alternate embodiments of the present invention, equations (6), (9), (14), and (15) are equally applicable.

The value of $K_1$ and $K_2$ in the analysis of the tubular fastening device for the three alternate embodiments, discussed above, are readily calculated and set forth in the following Table of Constants for equations (6) and (9), respectively.

TABLE OF CONSTANTS

| Embodiment | $K_1$ | $K_2$ |
|---|---|---|
| Fig. 11 | .181691 | .074384 |
| Fig. 12 | .099874 | .015936 |
| Fig. 13 | .070491 | .006080 |

Let us assume that a conentional tubular eyelet is employed in the fastening system of the present invention that is formed of soft brass having a yield strength ($S_y$) of 18,000 psi, a mean radius (R) of 0.08625 in. and a shank wall 55 thickness of 0.105 in. Such an eyelet is commercially available from United Eyelets under component number SE-67 Brass Flat Flange. The cross-section moment of inertia I with $b$ equal to 0.200 inches and $h$ equal to 0.0105 inches is calculated according to equation (13) to be 0.019293 × $10^{-6}$ inches$^4$. The radial pressure (P) at each contact area may now be readily calculated in accordance with equation (14) and is set forth in the following table for each of the three above-described alternate embodiments.

The holding force of any of the three alternate embodiments of the present invention is simply the total radial pressure ($P_t$) times the dry coefficient of static friction between the material of the eyelet shank and the bracing sidewalls at the contact areas. For a support plate 10 of mild steel and a brass eyelet 50 the dry coefficient of static friction is approximately 0.51.

TABLE OF RADIAL PRESSURE AND HOLDING FORCE

| Fastening System Embodiment | Radial Pressure (P) | Number of Contact Areas(N) | Total Pressure ($P_t$) in lbs. | Holding Force in lbs. |
|---|---|---|---|---|
| Fig. 4 | 5.16 | 2 | 10.32 | 5.26 |
| Fig. 12 | 4.22 | 3 | 12.66 | 6.46 |
| Fig. 13 | 5.98 | 4 | 23.92 | 12.20 |

Figure 10:
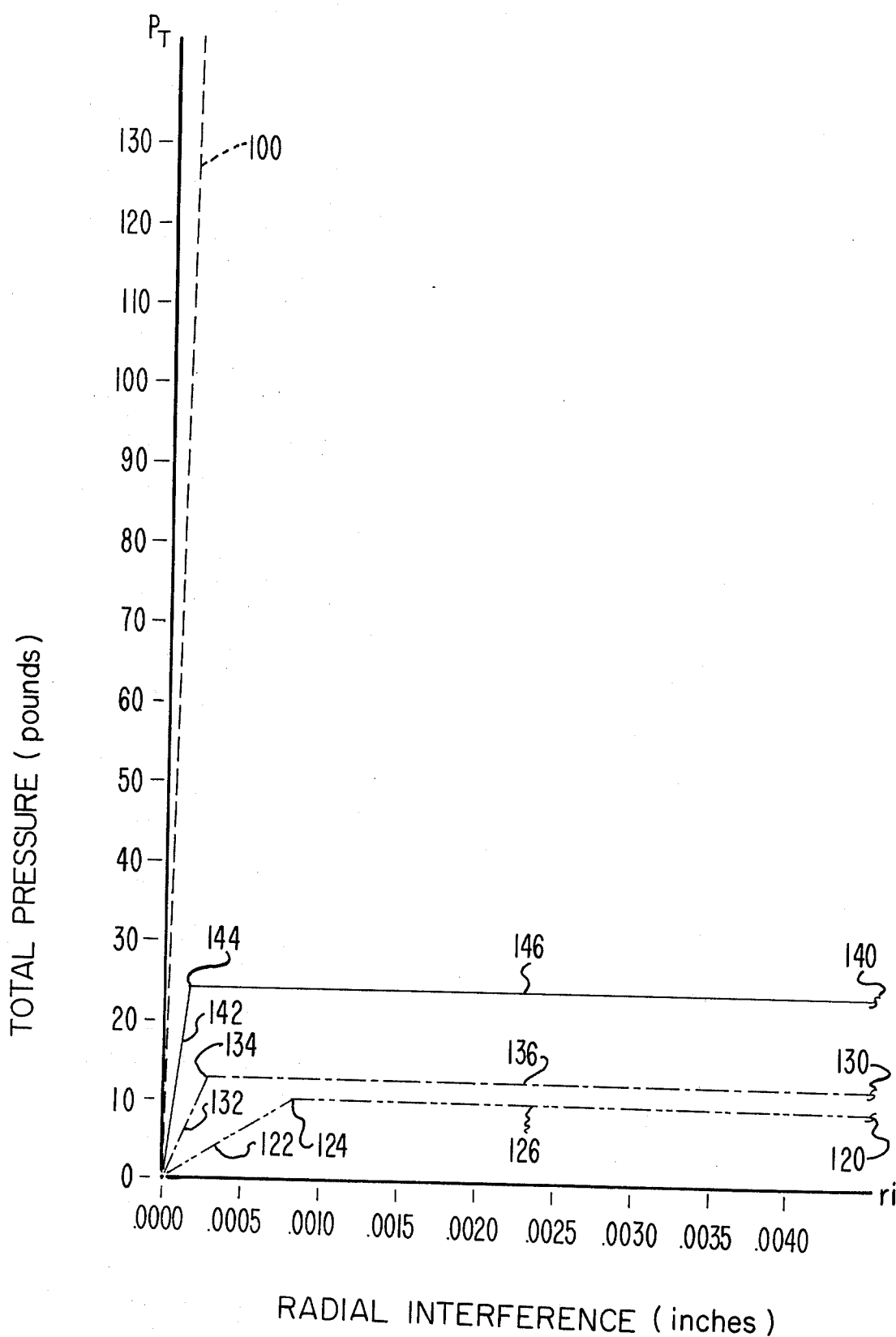
FIG. 10 is a graphical illustration of the total pressure versus radial interference for the three embodiments in FIGS. 1 through 9 of the present invention contrasted with the substantially unpredictable and constantly variable holding force of a tubular fastener inserted in a circular aperture.

Referring now to FIG. 10, the total radial pressure ($P_t$), which represents the total contact or sidewall pressure, versus radial interference ($ri$) for the three alternate embodiments of the present invention has been graphically plotted. A steep line 100 is plotted in the graph of FIG. 10, to contrast the predictable and substantially constant curves representative of the holding force of the present invention with the economically uncontrollable totally unpredictable, and extremely variable holding force of a fastening system employing an eyelet pressed into a circular aperture. The steepness of the line 100 clearly illustrates how rapidly the total pressure ($P_t$) and consequently the holding force, rises for extremely small increases in radial interference when a tubular eyelet having a circular cross section is pressed into a circular aperture. Since the tolerances of a conventional eyelet is typically plus or minus 0.002 inches, it is readily apparent in FIG. 10 that predicting the holding force of the eyelet would be impossible. Furthermore, ductile yielding of the shank of the eyelet does not occur with a circular aperture in the support plate. Therefore, the total pressure varies sharply with any increase in radial interference and at no time becomes constant.

Curve 120 (FIG. 10) represents the total pressure ($P_t$) versus the radial interference ($ri$) at each of the two contact areas for the embodiment of the present invention analyzed in conjunction with FIG. 11. The curve 120 includes a sloping portion 122 that represents the change in total pressure versus radial interference prior to achieving sufficient pressure to cause ductile yielding of the eyelet shank. The yield point of any material is the minimum stress at which further increases in strain may deform the material without increasing its stress. The knee 124 of the curve 120 represents the point at which ductile yielding at the contact areas of the eyelet shank occurs. Ductile yielding is ordinarily considered an undesirable cause of failure in structural materials. However, this normally undesirable phenomenon is advantageously employed in the present invention to provide a fastening system in which the holding force may be both constant and readily predictable over a wide range of radial interference. The flat portion 126 of the curve 120 represents the substantially constant total pressure created notwithstanding increased radial interference after ductile yielding has occured. The two contact area embodiment of the present invention, as represented by curve 120, provides the lowest holding force of the three alternate embodiments and requires the largest radial interference to produce ductile yielding.

The curve 130 (FIG. 10) represents the three contact area embodiment of the present invention as analyzed in conjunction with FIG. 12. The sloping portion 132 of the curve 130 corresponds to the total pressure versus radial interference prior to ductile yielding of the eyelet shank at each of the three contact areas. The knee 134 of the curve 130 represents the point at which ductile yielding of the eyelet shank at the contact areas occurs. It can be seen that the knee 134 of the curve 130 occurs at both a higher total pressure and a smaller radial interference than the occurrence of the knee 124 of the curve 120. Thus, the three sided aperture or three contact area embodiment of the present invention has the advantage of producing a greater substantially constant holding force over a wider and more tolerant interference range than results from the two contact area embodiment represented by the curve 120. The substantially flat portion 136 of the curve 130 represents the total pressure versus radial interference after ductile yielding has occurred at the three contact areas of the eyelet shank.

The curve 140 (FIG. 10) represents the total pressure versus radial interference for the four contact area embodiment of the present invention as analyzed in conjunction with FIG. 13. The sloping portion 142 represents the changing total pressure versus radial interference prior to achieving ductile yielding at the four contact areas of the eyelet shank. It can be seen predicting the total pressure at any point of radial interference along this sloping portion 142 is extremely difficult and would require an extremely precise radial interference. Such close tolerances are not ordinarily obtainable in conventional eyelet fasteners. However, once ductile yielding has occurred at the four contact areas as represented by the knee 144 of the curve 140, then the total pressure remains substantially constant as represented by the flat portion 146 for a very wide range of radial interference. Thus it may be appreciated that the four contact area embodiment of the present invention provides the highest total pressure and consequently the greatest holding force along with the widest range of radial interference of the three alternate embodiments.

If it is desired to further fasten a subassembly employing the fastening system of the present invention to an additional workpiece or assembly (not shown), a screw or bolt may be inserted through the cylindrical channel of the eyelet 50 retained in a non-circular aperture without degrading the integrity of the tubular fastening system. This maximizes the area of the workpiece 10 that may be employed for other than fastening purposes.

It should be noted that an eyelet 50 used in the fastening system of the present invention may be removed, as explained hereinafter, and re-used several times without any significant impairment of retention ability as a result of the Bauschinger effect on the previously ductile yielded contact areas of the eyelet shank 54.

Figure 14:
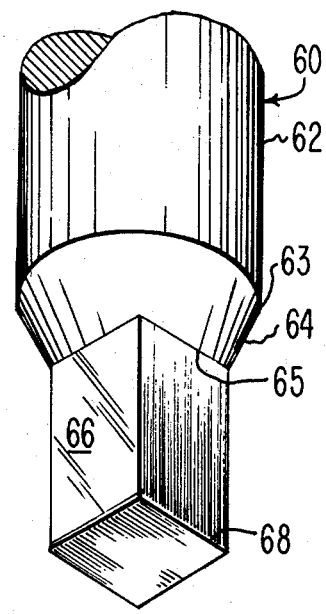
FIG. 14 is an isometric view of a punch tool employed to form the non-circular aperture in a support plate of the present invention.

The non-circular defined apertures 20, 30 and 40 (FIGS. 1, 2 and 3) may be provided in the support plate 10 by any conventional aperture defining instrument or tool. However, the non-circular defined aperture 40 along with the chamfer edge 46 may be most economically provided by a tool or a punch member generally referred to as 60 in FIGS. 14 and 15. The punch 60 comprises a body portion 62 having substantially circular cross section. A cutting edge 68 is provided at the extremity of the punch 60 and defines a multifaceted punch tip 66. The multifaceted punch tip 66 comprises a plurality of flat surfaces corresponding in number and shape to the desired configuration of the support plate aperture to be defined in the fastening system of the present invention. A truncated conical transition section 64 interconnects the circular body portion 62 and the multifaceted punch tip 66. The transition section or area 64 generally slopes outward from the multifaceted punch tip 66 from along edge 65 toward the shoulder 63 of the body portion 62.

Figure 15:
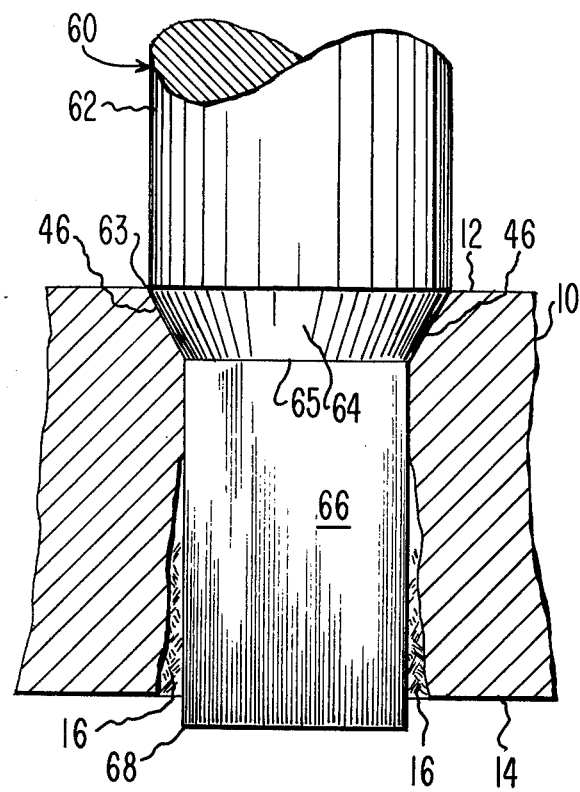
FIG. 15 is a cross section view of a support plate being punched by the punch tool of FIG. 14.

In operation, the cutting edge 68 of the tool 60 is punched through the top surface 12 (FIG. 15) of the support plate 10 to define the non-circular aperture of the support plate with a significantly finite number of contact sidewalls spaced apart to provide sufficient radial interference with the outside diameter of the hollow shank of the eyelet for effecting radial pressure that is at least equal to the pressure required for ductile yielding of the shank upon insertion therein. When punched through the workpiece 10, the cutting surface 68 and multifaceted punch tip 66 form the bracing sideqalls 42 and 44 which may be defined as comprising only a portion of the aperture 40. As is seen in FIG. 15, the bracing sidewall 42 is completely disposed within the aperture 40 and neither extends to the top surface 12 or to the bottom surface 14 of the support plate 10. Since only an inner portion of the thickness of the support plate 10 may comprise the bracing sidewalls 42, 44 of the aperture 40, an eyelet 50 may be employed that has a shank length less than the thickness of the support plate. Thus, the lead-in edge 56 of the eyelet 50 may be completely disposed within the aperture 40 without protruding from the lower surface 14 of the support plate.

As the punch 60 is forced downward through the support plate 10, a plug of material removed from the aperture 40 exits through the lower surface 14 of the support plate 10 and may result in a slightly roughened surface 16 defining an enlarged opening of the punched aperture at the lower surface 14, along a lower portion of the aperture 40 which in no way impairs the operation of the fastening system of the present invention. Rather, this enlarged opening may advantageously provide access for a removal tool (not shown) such as a philips screw driver. The tip of the philips screw driver, or any other suitable tool, would engage the lead-in edge 56 of the shank 54 and force the eyelet 50 out of the non-circular aperture. A die (not shown) having a round hole may be employed in cooperation with the punch 60 thereby obviating rotational alignment between the punch and die.

The punching of the tip 66 through the workpiece 10 is continued until the shoulder 63 that defines the upper limit of the transition zone 64 abuts the top surface 12 of the workpiece 10 forming the bevel or chamfer 46. This bevel or chamfer 46 adjacent the bracing sidewalls 42 and 44 provides assistance in the initial insertion of the eyelet 50, as previously explained. Thus, an economical method of providing a non-circular defined aperture in a support plate with a chamfer provided at each area of initial insertion of the eyelet 50 results from a single punching operation. Otherwise, a two step process would be required. A first step would be required to form the bracing sidewalls and then a second machining step to provide the chamfer.

Figure 16:
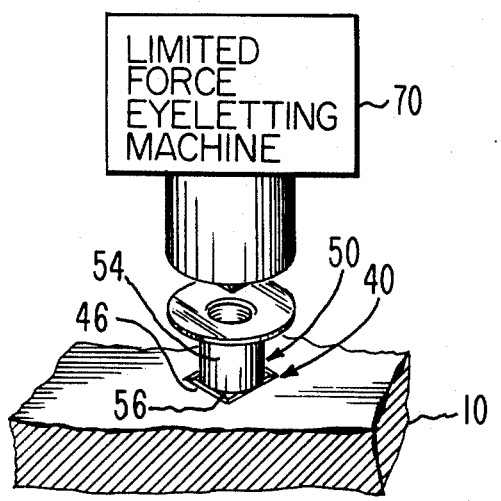
FIG. 16 is a perspective view of the insertion of an eyelet into a non-circular aperture of a support plate according to the method of the present invention.

Referring now to FIG. 16, a conventional limited force eyeletting machine 70 may be employed to force the insertion of the eyelet 50 into the non-circular defined aperture 40. The initial insertion of the eyelet 50 is assisted by the chamfer areas 46. The force of insertion provided from the limited force eyeletting machine 70 should be sufficient to overcome the resistance provided from the radial interference between the aperture 40 and the eyelet shank 54, remembering that the radial interference is sufficient to effect ductile yielding of the shank 54 upon insertion therein. The limited force eyeletting machine 70 must force the shank 54 into the aperture 40 at sufficient depth such that a significantly finite member of discrete contact areas of the ductile yielded shank impinge the bracing sidewalls 42, 44. Aside from this requirement, the eyelet may be forced any desired depth into the aperture without any impairment whatsoever of its retention ability.

The fastening system of the present invention may be advantageously employed to sealably fasten an apertured workpiece to a support member as shown in FIGS. 17, 18 and 19. The non-circular aperture 20 is formed in the support member 10 with opposed bracing sidewalls 22 defining the non-circular aperture 20 with sufficient radial interference with the outside diameter of the shank 54 of the eyelet 50 to effect ductile yielding at the two discrete contact areas upon insertion therein. This results in a predictable and substantially constant holding force, as previously described. A compressible sealing member 76, which may conveniently have an aperture 78 formed therein, overlies the support member 10 to which the workpiece 70 is to be sealably fastened. The workpiece 70 also includes an aperture 74 which is aligned with the sealing member aperture 78 and the non-circular defined aperture 20 of the support plate. The apertures 74 and 78, provided respectively in the workpiece, and the compressible sealing member are preferably circular and have a diameter greater than the outside diameter of the shank portion 54 of the eyelet 50 and yet a smaller diameter than the outside diameter of the head or flange 52. A depression or countersink 72 may be conveniently provided in the top surface of the workpiece 70 for completely receiving the head flange 52 of the eyelet 50.

Axial force may be applied to the head 52 of the eyelet 50 by a limited force eyeletting machine 70 (FIG. 16) to press the leading edge 56 of the eyelet shank, having been inserted through the workpiece aperture 74 and the compressible sealing member aperture 76, against the chamfer 26 for assistance in pressing the shank 54 against the bracing sidewalls 22 of the support plate 10. The holding force of the fastening system is preferably matched with the compression of the compressible sealing member 76 in order to provide a greatly enhanced seal between the workpiece 70 and the support plate 10. The eyelet 50 may be conveniently pressed into the support plate 10 by the limited force eyeletting machine with a slightly greater force than the matched holding force of the fastening system and the compression of the compressible sealing member. This results in slight compression of the compressible sealing member 76 with the head flange 52 being forced against the workpiece 70. Upon release of the application of limited force by the limitd force eyeletting machine 70, the inherent resiliency of the compressible sealing member will return the eyelet 50 to a position corresponding to the equalized compression of the compressible sealing member 76 and the holding force of the fastening system of the present invention. Thus a seal is formed with the fastening system of the present invention between the workpiece 70 and the support plate 10 that may be employed for the assembly of electronic components where sealing out possible contaminents is desired.

While particular embodiments of the present invention have been described in detail, it will be understood, of course, that modifications may be made therein without departing from the true spirit and scope of the invention defined in the appended claims.

I claim:

1. A fastening assembly for providing a readily predictable and substantially constant holding force comprising:
a thin-walled, hollow, cylindrical eyelet with a flanged head, the eyelet being formed of ductile, yet non-work hardening metal; and
a support member formed of a relatively rigid material and having formed therein an aperture with said eyelet received therein, the aperture being of such shape and dimension as to provide a plurality of discrete contact areas for the inserted eyelet in the aperture which interferingly contact the eyelet to create radial pressure sufficient to cause ductile yielding therein.

* * * * *